(12) United States Patent
Brun et al.

(10) Patent No.: US 11,148,622 B2
(45) Date of Patent: Oct. 19, 2021

(54) BUMPER BEAM HAVING RIBS ON SEVERAL WALLS OF THE BUMPER BEAM

(71) Applicant: ArcelorMittal, Luxembourg (LU)

(72) Inventors: Gilles Brun, Lamorlaye (FR); Damien Herisson, Luzarches (FR); Jimmy Lam, Noisy le Grand (FR); Dan Hasenpouth, Paris (FR); Elie Gibeau, Pont Sainte Maxence (FR); Ivan Viaux, Paris (FR)

(73) Assignee: ARCELORMITTAL, Luxembourg (LU)

( * ) Notice: Subject to any disclaimer, the term of this patent is extended or adjusted under 35 U.S.C. 154(b) by 0 days.

(21) Appl. No.: 16/349,411

(22) PCT Filed: Nov. 16, 2017

(86) PCT No.: PCT/IB2017/057168
§ 371 (c)(1),
(2) Date: May 13, 2019

(87) PCT Pub. No.: WO2018/092058
PCT Pub. Date: May 24, 2018

(65) Prior Publication Data
US 2019/0366960 A1 Dec. 5, 2019

(30) Foreign Application Priority Data
Nov. 18, 2016 (WO) .................. PCT/IB2016/056961

(51) Int. Cl.
*B60R 19/18* (2006.01)
*B21D 53/88* (2006.01)
(52) U.S. Cl.
CPC .............. *B60R 19/18* (2013.01); *B21D 53/88* (2013.01); *B60R 2019/1826* (2013.01)

(58) Field of Classification Search
None
See application file for complete search history.

(56) References Cited

U.S. PATENT DOCUMENTS 5,306,058 A 4/1994 Sturrus et al.
7,399,014 B2 7/2008 Mellis et al.
(Continued)

FOREIGN PATENT DOCUMENTS

DE 102011113823 A1 3/2013
DE 102013102818 A1 9/2014
(Continued)

OTHER PUBLICATIONS

International Search Report issued in connection with International application No. PCT/IB2017/057168 dated Feb. 23, 2018.
International Search Report issued in connection with International application No. PCT/IB2016/056961 dated Feb. 23, 2017.

*Primary Examiner* — Lori L Lyjak
(74) *Attorney, Agent, or Firm* — Davidson, Davidson & Kappel, LLC

(57) ABSTRACT

A bumper beam is made of at least one rolled formed steel sheet containing an upper beam and a lower beam extending in a transversal direction, the upper beam and the lower beam each having a closed cross-section defined by a front wall, a rear wall, an upper wall and a lower wall, the upper wall and the lower wall joining the front wall to the rear wall, each of the front walls of the upper beam and of the lower beam containing a front rib extending transversally and towards the interior of the bumper beam. At least one of the upper wall of the upper beam, the lower wall of the lower beam, the rear wall of the upper beam and the rear wall of the lower beam further containing a rib extending transversally and towards the interior of the bumper beam.

18 Claims, 6 Drawing Sheets

(56) References Cited

U.S. PATENT DOCUMENTS

| | | |
|---|---|---|
| 8,016,331 B2 | 9/2011 | Ralston et al. |
| 8,716,624 B2 | 5/2014 | Johnson et al. |
| 9,381,880 B2* | 7/2016 | Matecki ............... B60R 19/023 |
| 9,586,545 B2 | 3/2017 | Kibben et al. |
| 2003/0047952 A1 | 3/2003 | Trappe |
| 2003/0155806 A1 | 8/2003 | Goto et al. |
| 2004/0094977 A1 | 5/2004 | Shuler et al. |
| 2004/0130166 A1 | 7/2004 | Trancart et al. |
| 2005/0116498 A1 | 6/2005 | Kobayashi et al. |
| 2008/0284183 A1 | 11/2008 | Johnson |
| 2012/0074720 A1 | 3/2012 | Johnson et al. |
| 2012/0228889 A1 | 9/2012 | Haneda et al. |
| 2014/0033791 A1 | 2/2014 | Johnson et al. |
| 2014/0361558 A1 | 12/2014 | Malkowski et al. |
| 2015/0015007 A1 | 1/2015 | Johnson et al. |
| 2016/0059812 A1 | 3/2016 | Johnson et al. |
| 2016/0264081 A1 | 9/2016 | Kibben et al. |
| 2016/0280163 A1* | 9/2016 | Matecki .................... E04C 3/06 |
| 2017/0259767 A1* | 9/2017 | Johnson ............. B23K 26/0619 |
| 2019/0366960 A1 | 12/2019 | Brun et al. |

FOREIGN PATENT DOCUMENTS

| | | |
|---|---|---|
| EP | 1262374 A1 | 12/2002 |
| EP | 1378402 A1 | 1/2004 |
| JP | H07246894 A | 9/1995 |
| JP | 2000334529 A | 12/2000 |
| JP | 2003237507 A | 8/2003 |
| JP | 2005170232 A | 6/2005 |
| JP | 2009035027 A | 2/2009 |
| JP | 2011098630 A | 5/2011 |
| JP | 2013537868 A | 10/2013 |
| KR | 20050072667 A | 7/2005 |
| KR | 100770504 B1 | 10/2007 |
| KR | 20130136785 A | 12/2013 |
| KR | 20160077790 A | 7/2016 |
| RU | 2013118583 A | 10/2014 |
| WO | 02055230 A1 | 7/2002 |
| WO | WO02055230 A1 | 7/2002 |
| WO | WO2016046582 A1 | 3/2016 |

* cited by examiner

BUMPER BEAM HAVING RIBS ON SEVERAL WALLS OF THE BUMPER BEAM

FIELD OF THE INVENTION

The present invention provides a bumper beam for an automotive vehicle of the type made of at least one rolled formed steel sheet comprising an upper beam and a lower beam extending in a transversal direction, said upper beam and said lower beam each having a closed cross-section defined by a front wall, a rear wall, an upper wall and a lower wall, the upper wall and the lower wall joining the front wall to the rear wall, wherein each of the front walls of the upper beam and of the lower beam comprises a front rib extending transversally and towards the interior of the bumper beam.

The invention also provides to a method for producing such a bumper beam.

BACKGROUND OF THE INVENTION

Bumper beams comprising an upper beam and a lower beam are known as "8-shaped" bumper beams when a central wall forms both the lower wall of the upper beam and the upper wall of the lower beam and as "B-shaped" bumper beams when a space extends between the lower wall of the upper beam and the upper wall of the lower beam. Such bumper beams are known for having good strength and impact characteristics, thanks to the lower wall of the upper beam and to the upper wall of the lower beam which increases the resistance of the bumper beam, while remaining relatively light and being adapted to the available space in the vehicle where the bumper beam is to be installed. Documents U.S. Pat. No. 8,716,624 and US 2014/0361558, for example, disclose 8-shaped bumper beams and document WO-2016/046582, for example, discloses a B-shaped bumper beam.

A bumper beam is required to have a particular behavior in case of an impact, for example a pole test impact, wherein a localized obstacle hits the central part of the bumper beam at a speed around 15 Km/h. More particularly, the bumper beam has to be able to be deformed while absorbing energy when the impact occurs such that the energy of the impact is not or less transmitted to the parts extending behind the bumper beam in the vehicle.

To this end, the bumper beam has to have satisfactory characteristics in terms of resistance to a peak effort greater than a predetermined effort threshold, which is applied to the bumper beam during the impact, of minimal energy absorbed after deformation of the bumper beam at a predetermined distance of deformation due to the impact and of resistance to breaking during the deformation of the bumper beam when the peak effort is applied to the bumper beam as well as after an important amount of deformation, meaning that the bumper beam has to be plastically deformed and not break over a predetermined distance of deformation to ensure absorption of the energy during the plastic deformation.

When designing a new bumper beam, one tries to have the best results in these three parameters (resistance to a peak effort, minimal energy absorbed and resistance to breaking). However, trying to improve one of these characteristics is generally detrimental to one and/or the other characteristics. For example, increasing the resistance of the bumper beam, for example by modifying the geometry of the bumper beam or by increasing its tensile strength, such that it can resist to a greater peak effort makes the bumper beam less deformable and more likely to break before the deformation of the bumper beam reaches the predetermined distance.

Furthermore, it is known to bend the bumper beam in the transversal direction in order to obtain a curved bumper beam having an improved behavior and more adapted to the geometry of the vehicle. However, bending the bumper beam can cause the rear walls, formed by planar surfaces of large dimensions, of the bumper beam to buckle. This buckling creates waves in the planar surfaces which therefore do not remain planar after bending. This phenomenon is greater as the radius of curvature of the bumper beam is smaller. This buckling is problematic because the depth and height of the waves can be around or exceed the acceptable manufacturing tolerances. Consequently, the integration of the bumper beam with the surrounding components, for example with crash-boxes arranged at the end of the bumper beam can be problematic.

BRIEF SUMMARY OF THE INVENTION

An object of the present invention is to provide a bumper beam having improved features in terms of behavior and/or in terms of quality of the bumper beam.

To this end, the present invention provides a bumper beam of the above-mentioned type, wherein at least one of the upper wall of the upper beam, the lower wall of the lower beam, the rear wall of the upper beam and the rear wall of the lower beam further comprises a rib extending transversally and towards the interior of the bumper beam.

Providing a rib in one of the rear wall allows for reducing the dimensions of the planar surfaces forming the rear wall on either side of the rib by reducing the height of the planar surfaces. Indeed, the effort to induce buckling of a surface becomes lower as the length of the surface in the elevation direction increases. As compared to this situation wherein the rear wall extends in a single plane, since providing a rib in the rear wall makes it possible to reduce the length of the planar surfaces in the elevation direction, buckling of the planar surfaces can be avoided because the effort to induce buckling is greater and remains inferior to the effort applied on the bumper beam during the bending of the bumper beam. Consequently, thanks to the rear rib, buckling of the rear wall can be avoided during the bending of the bumper beam.

Providing a rib in one of the upper wall of the upper beam or in the lower wall of the lower beam, in addition to avoiding buckling, improves the performances of the bumper beam in terms of resistance to breaking and in terms of resistance to a peak effort by creating a further deformation pattern during the impact.

In certain embodiments, the present invention is directed to a bumper beam for an automotive vehicle made of at least one rolled formed steel sheet comprising an upper beam and a lower beam extending in a transversal direction, said upper beam and said lower beam each having a closed cross-section defined by a front wall, a rear wall, an upper wall and a lower wall, the upper wall and the lower wall joining the front wall to the rear wall, wherein each of the front walls of the upper beam and of the lower beam comprises a front rib extending transversally and towards the interior of the bumper beam, wherein at least one of the upper wall of the upper beam, the lower wall of the lower beam, the rear wall of the upper beam and the rear wall of the lower beam further comprises a rib extending transversally and towards the interior of the bumper beam.

In some embodiments, at least one of the rear walls of the upper beam and of the lower beam comprises a rear rib extending transversally and towards the interior of the bumper beam.

In some embodiments, the rear rib has a curved cross-section having a radius of curvature greater or equal to 0.5 times the thickness of the steel sheet.

In some embodiments, the rear wall on which the rear rib extends comprises at least two planar surfaces extending on either side of the rear rib, the position and/or the height of the rear rib being arranged such that each planar surface has a height inferior or equal to half of the height of the rear wall on which the rear rib extends.

In some embodiments, the depth of the rear rib is superior or equal to 0.5 times the thickness of the steel sheet and inferior than or equal to the distance between the front wall and the rear wall on which said rear rib extends.

In some embodiments, the rear rib extends opposite a front rib.

In some embodiments, each of the rear walls of the upper beam and of the lower beam comprises a rear rib extending transversally and towards the interior of the bumper beam.

In some embodiments, the upper wall of the upper beam and/or the lower wall of the lower beam comprise a reinforcement rib extending transversally and towards the interior of the bumper beam.

In some embodiments, the reinforcement rib has a curved cross-section having a radius of curvature greater than or equal to 0.5 times the thickness of the steel sheet.

In some embodiments, the depth of the reinforcement rib is superior than or equal to 0.5 times the thickness of the steel sheet and inferior or equal to a third of the distance between the upper wall of the upper beam and the lower wall of the lower beam.

In some embodiments, the bumper beam is curved in the transversal direction, the curvature radius of the bumper beam being less than or equal to 4000 mm.

In some embodiments, the steel sheet is made of a steel having a tensile strength greater or equal to 980 Mpa.

In some embodiments, the steel sheet has a thickness substantially comprised between 0.8 mm and 1.5 mm.

In some embodiments, a central wall extending between the front walls and the rear walls of the upper beam and of the lower beam forms both the lower wall of the upper beam and the upper wall of the lower beam.

In some embodiments, the central wall extends in at least two different planes.

In some embodiments, a space extends between the lower wall of the upper beam and the upper wall of the lower beam.

In some embodiments, the lower wall of the upper beam and/or the upper wall of the lower beam extends in at least two different planes.

In some embodiments, the bumper beam further comprises a reinforcement element made of a steel sheet, said reinforcement element being attached to the upper beam and to the lower beam such that the reinforcement element extends opposite at least a part of the front walls of the upper beam and of the lower beam and defines with said front walls at least one cavity extending between said front walls and said reinforcement element.

The invention also relates to a method for producing a bumper beam as described above, comprising the steps of:
  providing a steel sheet,
  roll forming the steel sheet in successive rolling stations in order to form a bumper beam comprising an upper beam and a lower beam extending in a transversal direction, said upper beam and said lower beam each having a closed cross-section defined by a front wall, a rear wall, an upper wall and a lower wall, the upper wall and the lower wall joining the front wall to the rear wall, wherein each of the front walls of the upper beam and of the lower beam comprises a front rib extending transversally and towards the interior of the bumper beam, wherein at least one of the upper wall of the upper beam, the lower wall of the lower beam, the rear wall of the upper beam and the rear wall of the lower beam is shaped in at least one of the rolling stations to comprise a rib extending transversally and towards the interior of the bumper beam.

In some embodiments, the steel sheet is made of a steel having a tensile strength greater or equal to 980 MPa.

BRIEF DESCRIPTION OF THE DRAWINGS

Other aspects and advantages of the present invention will will be understood upon reading the following description, given by way of example and made in reference with the appended drawings, in which.

DETAILED DESCRIPTION OF THE INVENTION

In the description, the term "longitudinal" is defined according to the rear-front direction of a vehicle and the term "transversal" is defined according to the left-right direction of the vehicle. The terms "up", "upper", "lower" are defined relative to the elevation direction of a vehicle.

Figure 1:
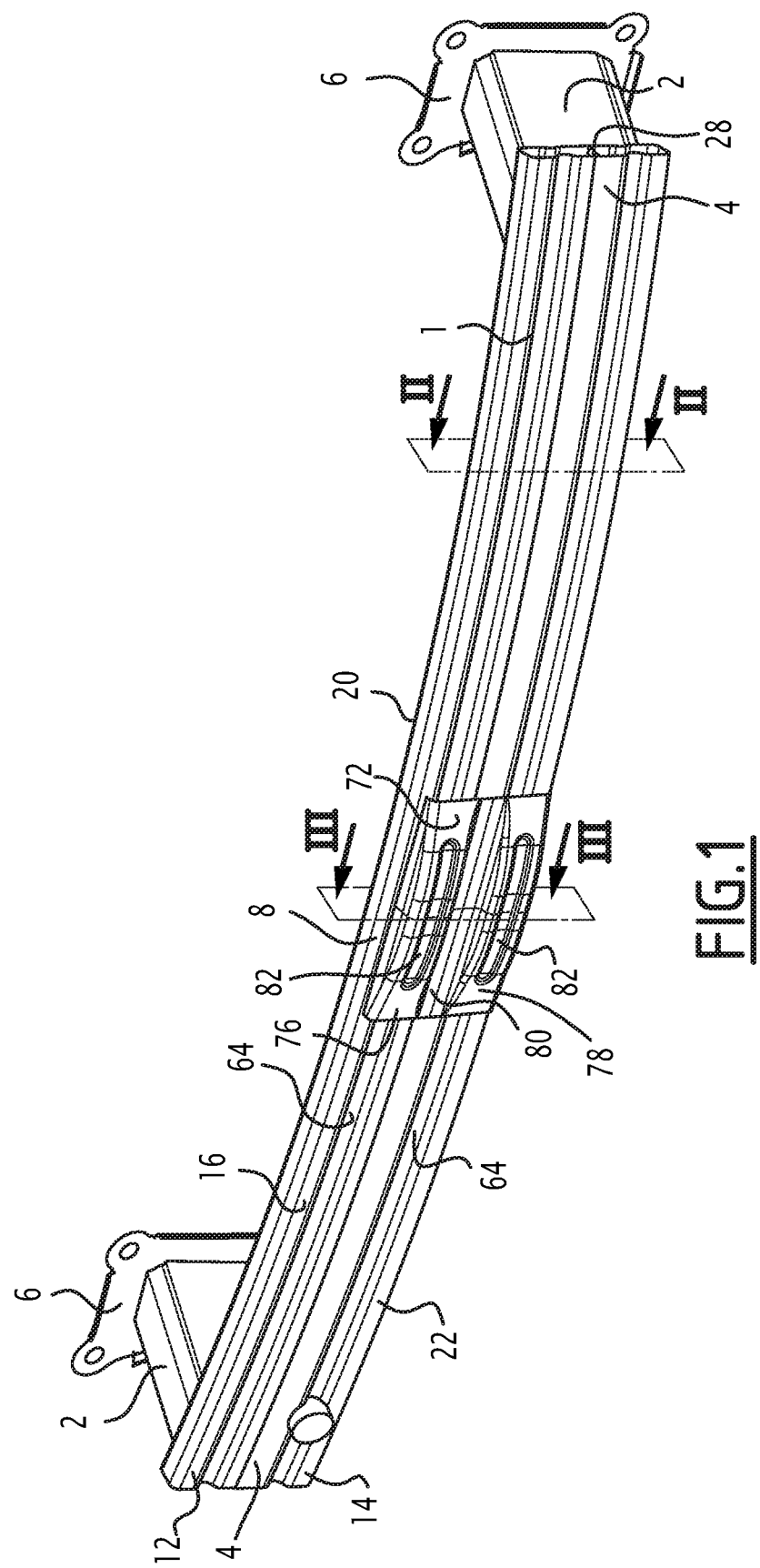
FIG. 1 is a perspective view of a bumper beam assembly comprising a bumper beam according to the invention.

In reference to FIG. 1, a bumper beam assembly for an automotive vehicle is described. Such a bumper beam assembly is to be arranged at the front and/or at the rear of a vehicle to protect the motor compartment and the vehicle compartment in case of a front and/or rear impact against the vehicle.

The bumper beam assembly comprises a bumper beam 1 extending substantially transversally and two crash-boxes 2 extending in the longitudinal direction attached to the bumper beam 1 in the vicinity of each transversal ends 4 of the bumper beam 1. An attachment plate 6 is provided at the end of each crash-box 2 opposite the bumper beam 1 for attaching the bumper beam assembly to the body of the vehicle, for example to the longitudinal rails of the vehicle. The bumper beam 1 is dimensioned for extending along a major part of the width of the vehicle in the transversal direction. According to an embodiment, the bumper beam 1 extends over a distance slightly larger than the distance separating the two longitudinal rails of the vehicle, for example over a distance of 70% of the width of the vehicle.

The bumper beam 1 is arcuate in the transversal direction, meaning that the bumper beam 1 has a curved shape arranged such that a central part 8 extends further towards the exterior of the vehicle than the transversal ends 6 of the bumper beam 1. This means that the extrados of the bumper beam is intended to extend towards the exterior of the vehicle while the intrados is intended to extend towards the interior of the vehicle. The radius of curvature of the bumper beam 1 is for example inferior or equal to 4000 mm, for example comprised between 2000 mm and 4000 mm. The curvature radius can be constant or not along the transversal direction.

The bumper beam 1 is obtained by roll forming a steel sheet 10 (FIG. 6), meaning that the steel sheet is folded and bent into shape as will be described in greater detail subsequently. More particularly, the steel sheet 10 is for example profiled into shape. The steel sheet 10 is made of a steel having a tensile strength greater or equal to 980 MPa, for example greater than 1500 MPa or greater than 1700 MPa. The steel for example comprises at least 35% of martensite or of bainite. According to an embodiment, the steel is for example a fully martensitic steel having a tensile strength of 1500 MPa. The steel can be coated, for example with a Zinc or Aluminum based coating. Alternatively, the steel is left uncoated. The steel sheet 10 has a thickness comprised between 0.8 mm and 1.5 mm, for example around 1 mm. The thickness of the steel sheet is not necessarily constant, in order to form portions of different thicknesses in the bumper beam 1.

The steel sheet 10 is folded in such a manner that the bumper beam 1 comprises an upper beam 12 and a lower beam 14 each extending in the transversal direction, the upper beam 12 extending above the lower beam 14 in the elevation direction of the vehicle.

The upper beam 12 comprises a front wall 16 intended to extend towards the exterior of the vehicle, a rear wall 18 substantially parallel to the front wall 16 and intended to extend towards the interior of the vehicle and an upper wall 20 joining the upper end of the front wall 16 to the upper end of the rear wall 18.

The lower beam 14 comprises a front wall 22 intended to extend towards the exterior of the vehicle, a rear wall 24 substantially parallel to the front wall 22 and intended to extend towards the interior of the vehicle and a lower wall 26 joining the lower end of the front wall 22 to the lower end of the rear wall 24.

Figure 2:
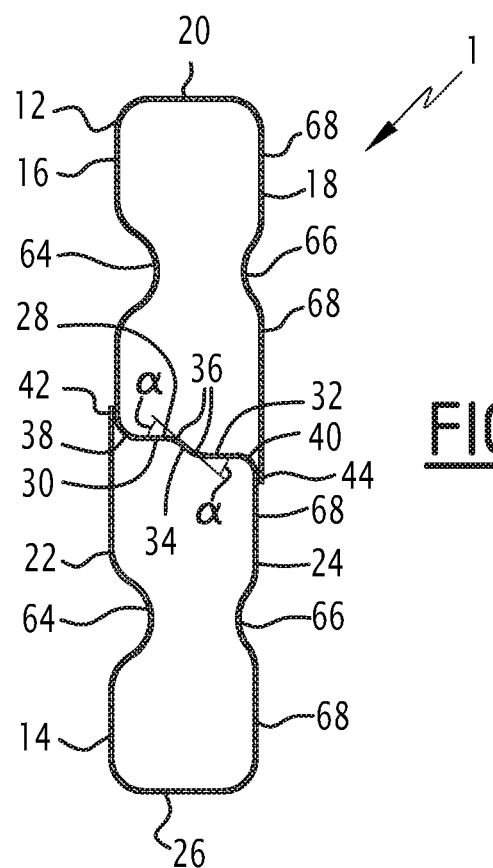
FIG. 2 is a cross-section view along plane II-II of FIG. 1.
Figure 3:
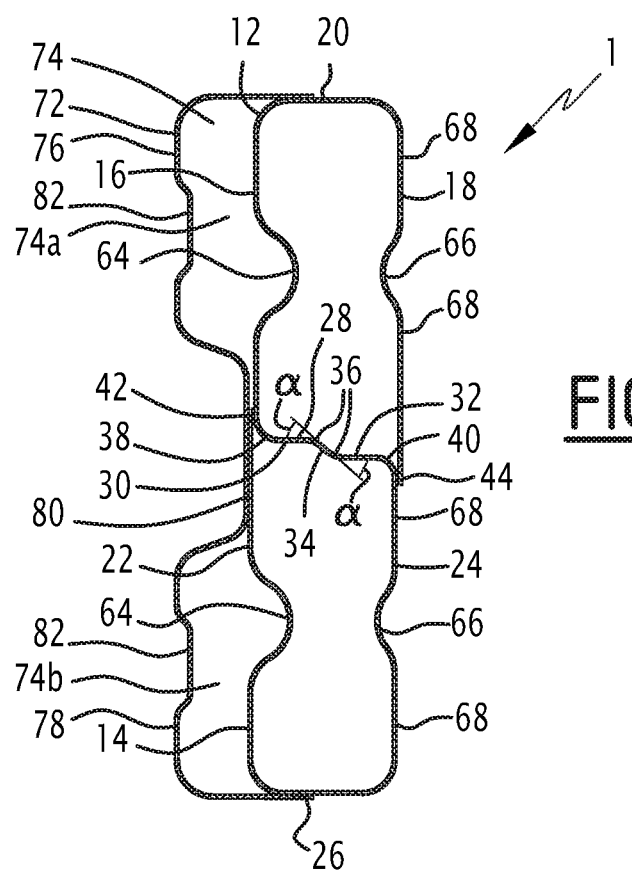
FIG. 3 is a cross-section view along plane of FIG. 1.

According to a first embodiment shown in FIGS. 1 to 3, the bumper beam 1 further comprises a central wall 28 joining the front walls 16, 22 to the rear walls 18, 24 of the upper and lower beams 12, 14 and extending between the upper wall 20 of the upper beam 12 and the lower wall 26 of the lower beam 14. The central wall 28 therefore forms both a lower wall of the upper beam 12 and an upper wall of the lower beam 14 and is common to the upper and lower beams 12, 14, as shown in FIGS. 2 and 3.

Figure 4:
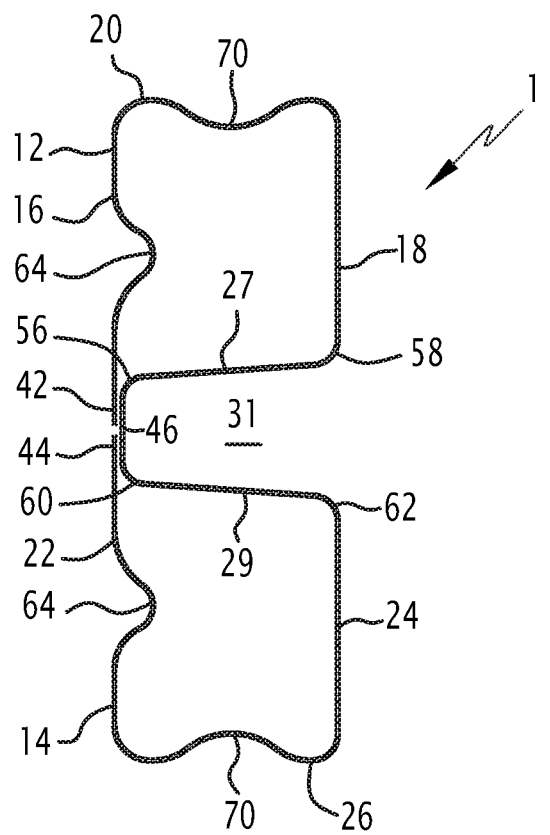
FIG. 4 is a cross-section view of a bumper beam according to another embodiment of the invention.
Figure 5:
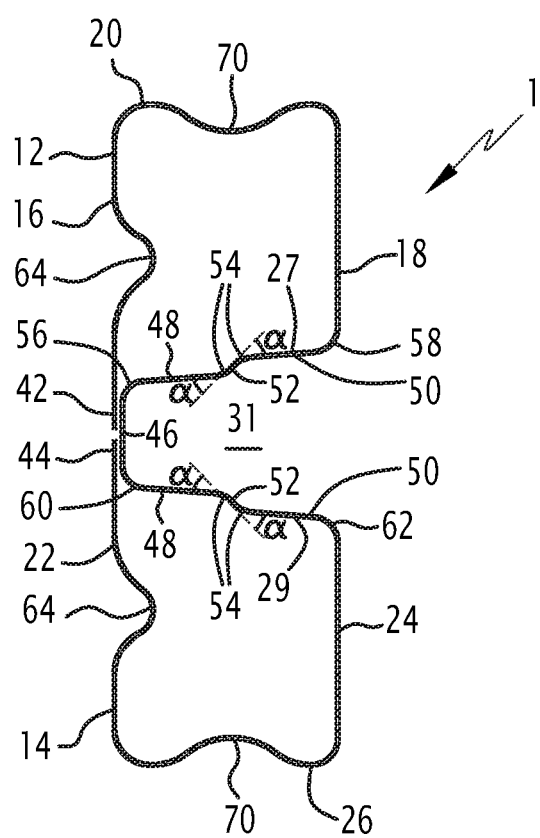
FIG. 5 is a cross-section view of a bumper beam according to another embodiment of the invention.

According to a second embodiment shown in FIGS. 4 and 5, the upper beam 12 comprises a lower wall 27 and the lower beam 14 comprises an upper wall 29 separate from the lower wall 27 of the upper beam 12. The lower wall 27 of the upper beam 12 is separated from the upper wall 29 of the lower beam 14 by a space 31.

The front wall 16 of the upper beam 12 and the front wall 22 of the lower beam 14 extend substantially in a same plane and the rear wall 18 of the upper beam 12 and the rear wall 24 of the lower beam extend substantially in a same plane parallel to the plane of the front walls 16, 22. In the mounted state, the planes of the front walls 16, 22 and of the rear walls 18, 24 are planes containing an elevation and a transversal directions, corresponding substantially to vertical planes. The distance between the front walls 16, 22 and the rear walls 18, 24 is for example around 30 mm.

The upper wall 20 of the upper beam 12 and the lower wall 26 of the lower beam 14 are for example substantially parallel to each other and for example substantially perpendicular to the planes of the front walls 16, 22 and of the rear walls 18, 24. In the mounted state, the planes of the upper wall 20 and of the lower wall 26 are planes containing a longitudinal and a transversal directions, corresponding substantially to horizontal planes. The distance between the upper wall 20 of the upper beam 12 and the lower wall 26 of the lower beam 14 is for example around 120 mm.

According to the first embodiment, the central wall 28 extends substantially at the same distance from the upper wall 20 of the upper beam 12 and from the lower wall 26 of the lower beam 14 such that the upper beam 12 and the lower beam 14 have substantially the same dimensions and equal cross-sections. According to a variant, the central wall 28 could extend at different distances from the upper wall 20 and lower wall 26, such that one of the cross-sections of the upper beam 12 and of the lower beam 14 is greater than the other cross-sections.

According to the first embodiment, the bumper beam 1 therefore has a cross-section in a plane perpendicular to the transversal direction having an 8-shape as shown in FIGS. 2 and 3. However, the cross-section of the bumper could be different, for example by having non parallel front and rear walls and/or non-parallel upper and lower walls.

According to a particularly advantageous variant of the first embodiment, the central wall 28 comprises at least one change of plane between the front walls 16, 22 and the rear walls 18, 24, meaning that the central wall 28 extends in at least two different planes. The central wall 28 comprises a front part 30 connected to the front walls 16, 22, a rear part 32 connected to the rear walls 18, 24, and a central part 34 connecting the front part 30 to the rear part 32. The central part 34 extends in a plane different from the plane in which the front part 30 and/or the rear part 32 extend. According to the embodiment shown in FIGS. 2 and 3, the front part 30 extends in a first plane, the rear part 32 extends in a second plane and the central part 34 extends in a third plane. The first and second planes are substantially parallel and perpendicular to the planes of the front walls 16, 22 and of the rear walls 18, 24. The third plane is inclined between the first plane and the second plane. For example, the third plane forms an angle α comprised between 10° and 170° with the first and second planes. According to an example, angle α is comprised between 30° and 60°. The central part 34 therefore forms a step in the central wall 28. During the deformation of the bumper beam during an impact, the step in the central wall separates the central wall in two parts extending in different planes, which therefore delays the buckling of the two parts. Indeed, the effort to induce buckling of a surface becomes lower as the length of the surface in the longitudinal direction in which the effort is applied on the bumper beam during the impact increases. Compared to a central wall extending in a single plane, since providing a step in the central wall makes it possible to reduce the length of the surface of the first and second parts of the central wall in the longitudinal direction, buckling of the first and second parts is delayed since the effort to induce buckling is greater. Delaying the buckling allows maintaining the hollow bodies of the upper beam 12 and of the lower beam 14 over a greater distance of deformation which improves the performances of the bumper beam during the impact in terms of absorbed energy.

The central part 34 is connected to the front part 30 and to the rear part 32 by radiused portions 36, i.e. curved portions making the transition between the first plane and the third plane and between the third plane and the second plane. The radius of curvature of the radiused portions 36 is greater or equal to 0.5 times the thickness of the steel sheet 10. According to an example, the radius of curvature of the radiused portions 36 is greater or equal to two times the thickness of the steel sheet 10. According to the example mentioned previously, the radius of curvature of the radiused portions 36 is therefore greater or equal to a value between 1.6 mm and 3 mm depending on the thickness of the steel sheet 10.

The first part 30 extends for example at a height different than the height of the second part 32, meaning that the distance between the first part 30 and the upper wall 20 of the upper beam 12, respectively the lower wall 26 of the lower beam 14, is different than the distance between the second part 32 and the upper wall 20 of the upper beam 12, respectively the lower wall 26 of the lower beam 14. According to the embodiment shown in FIGS. 2 and 3, the first distance between the first part 30 and the upper wall 20 of the upper beam 12 is less than the second distance between the second part 32 and the upper wall 20 of the upper beam 12, meaning that the first part 30 extends higher than the second part 32 in the mounted state of the bumper beam. According to an embodiment, the difference between the first distance and the second distance is less than a third of the distance separating the upper wall 20 of the upper beam 12 from the lower wall 26 of the lower beam 14, i.e. less than 40 mm according to the example described previously. According to an embodiment, the difference between the first distance and the second distance, corresponding to the distance between the first plane and the second plane, is around 10 mm.

The first part 30 is connected to the front wall 16 of the upper beam 12 by a radiused front end 38 and the second part 32 is connected to the rear wall 24 of the lower beam 14 by a radiused rear end 40. Like the radiused portions 36 between the central part 36 and the front and rear parts 30, 32, the radius of curvature of the radiused front and rear ends 38, 40 is greater or equal to 0.5 times the thickness of the steel sheet 10. According to an example, the radius of curvature of the radiused ends 38, 40 is greater or equal to two times the thickness of the steel sheet 10.

According to the embodiment shown in FIGS. 1 and 2, the central wall 28 has a center of symmetry at the center of the central wall in the longitudinal direction.

The central wall 28 extending substantially at the center of the bumper beam 1 increases the resistance of the bumper beam 1. Consequently, the bumper beam 1 can resist to a greater peak effort during an impact. Furthermore, the step formed by the central part 34 delays buckling of the surfaces extending in a single plane during the impact, which makes the bumper beam 1 able of absorbing a greater quantity of energy during the deformation of the bumper beam 1 and less likely to break during deformation as explained previously. Consequently, the central wall 28 improves the characteristics of the bumper beam.

Figure 6:
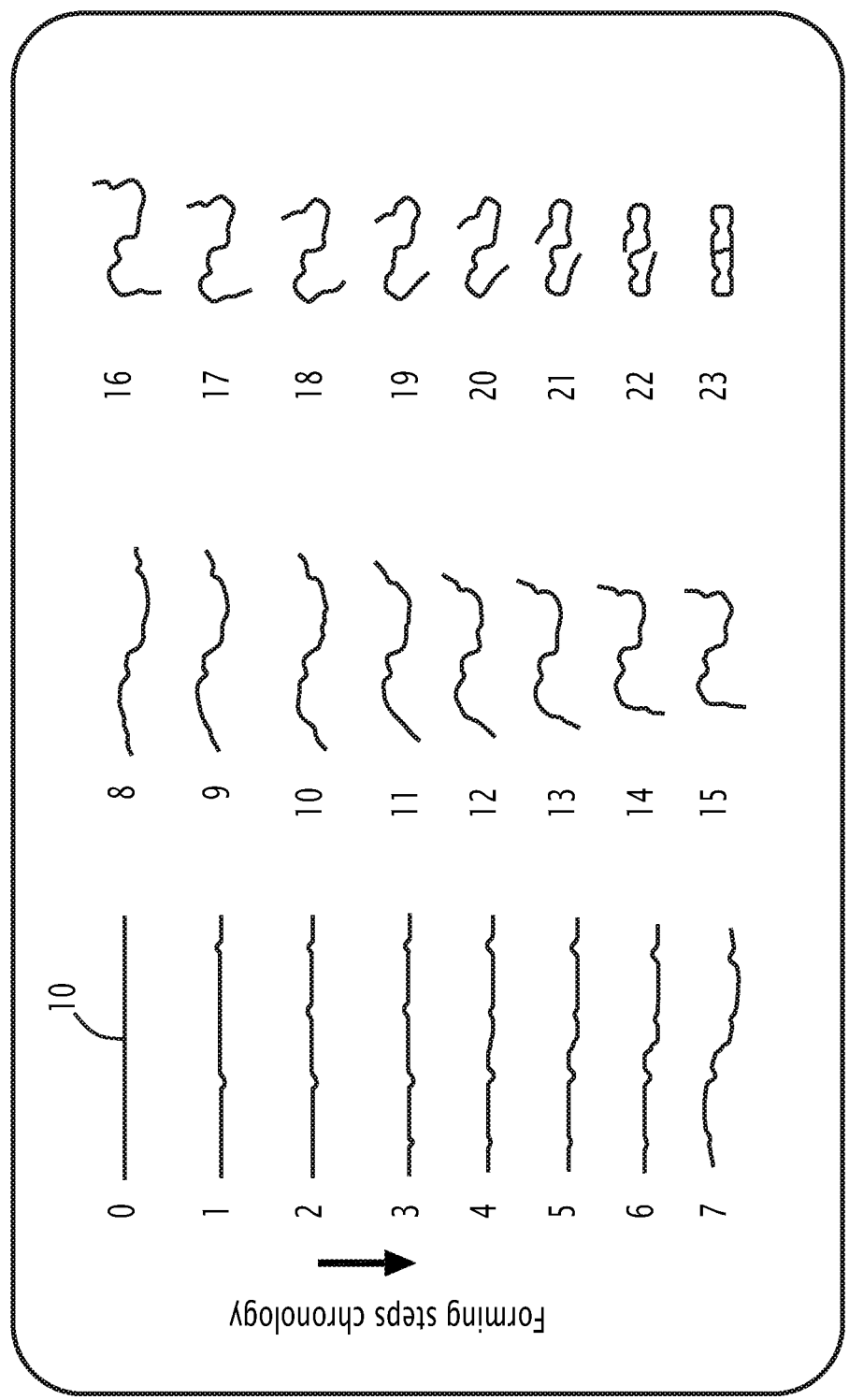
FIG. 6 is a series of cross-sections showing a shape of a steel sheet at each forming step when forming the bumper beam of FIG. 1.
Figure 7:
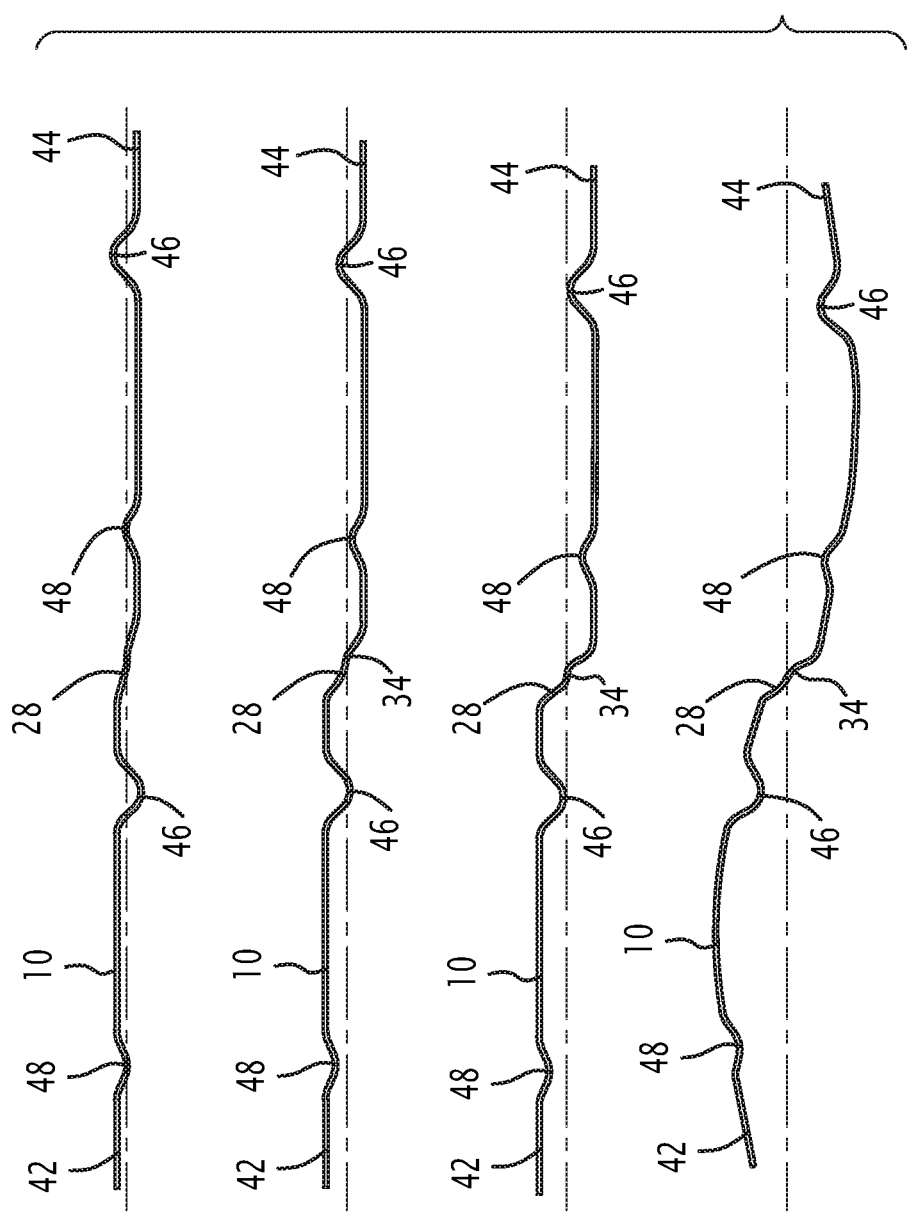
FIG. 7 is an enlarged view of steps 4 to 7 shown in FIG. 5.
Figure 8:
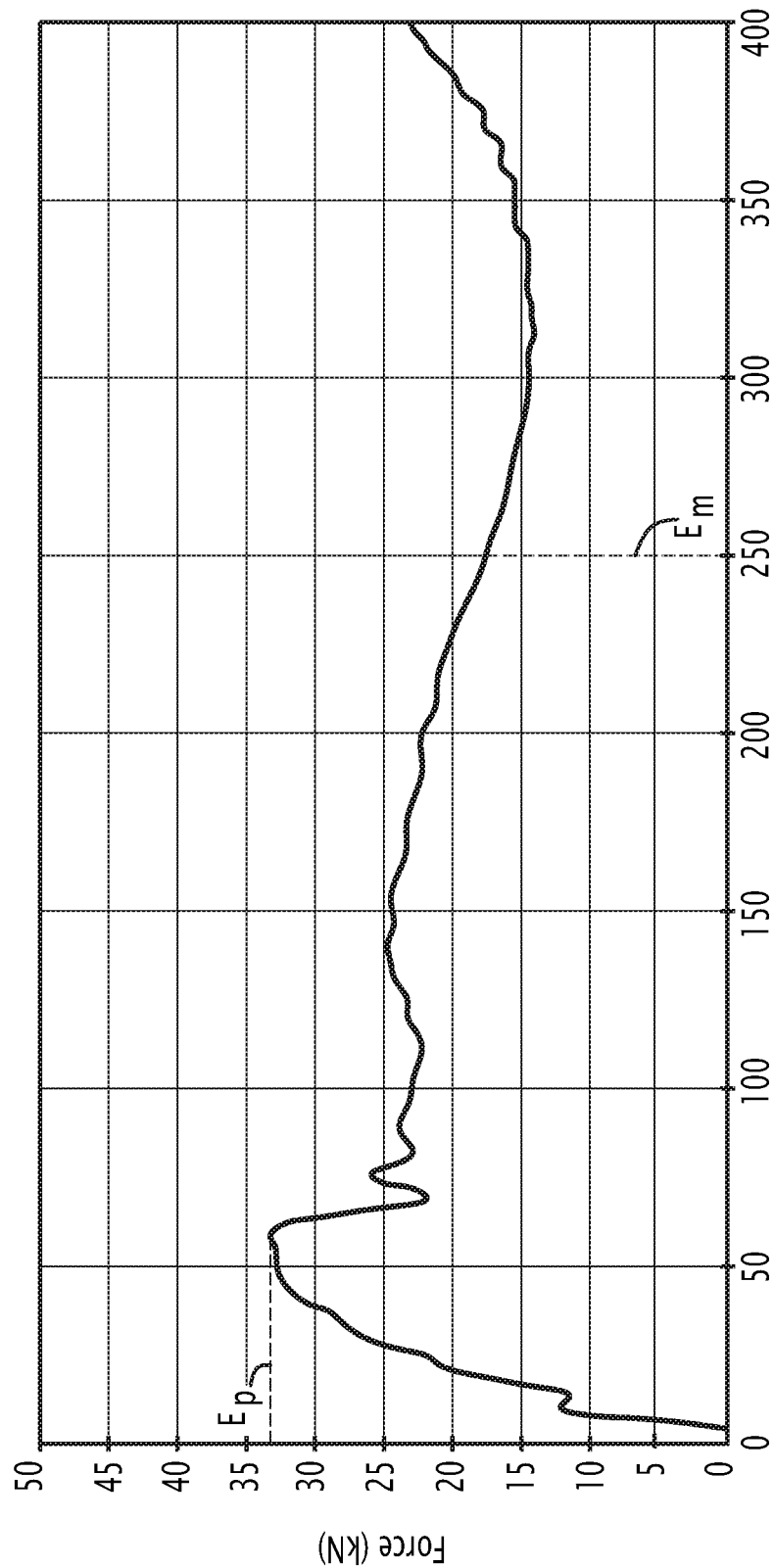
FIG. 8 is a diagram showing the force applied to the bumper beam relative to a distance of deformation of the bumper beam of FIG. 1.

In the diagram shown in FIG. 6 showing the force applied to the bumper beam relative to the distance of deformation of the bumper beam, the peak effort is shown on the force ordinate at "Ep". The distance of deformation at which a minimal energy is still absorbed without the bumper beam breaking is shown on the distance ordinate at Em. This can be obtained with a central wall 28 according to the above embodiment of the invention, because with such a central wall, it is for example possible to delay the buckling of the central wall 28 by 10 ms to 20 ms during a front impact against the bumper beam occurring at a speed of 15 Km/h.

It should be understood that the shape of the central wall 28 could be different. According to an example, the first and second parts 30, 32 of the central wall could extend in a same plane while the central part 34 could extend in more than one plane. The front end 38 could be connected to the front wall 22 of the lower beam 14 while the rear end 40 could be connected to the rear wall 18 of the upper beam 12. The first part 30 could extend at a height inferior to the height of the second part 32.

The steel sheet 10 extends between a first edge 42 and a second edge 44, as shown in FIG. 4. When the bumper beam 1 is formed, the first edge 42 is attached to the front wall 16 of the upper beam 12 and covers the radiused front end 38 of the central wall 28 and the second edge 44 is attached to the rear wall 24 of the lower beam 14 and covers the radiused rear end 40 of the central wall 28. Consequently, the first and second edges 42 and 44 close the cross-sections of the upper and lower beams 12, 14. The first and second edges 42, 44 extend in planes parallel to the planes of the front walls 16, 22 and rear walls 18, 24 such that planar surfaces are attached together when the edges are attached to the front and rear walls. This makes the closing of the cross-sections an easier step. For example, the first and second edges 42, 44 are attached by welding the front and rear walls 16, 24 and welding flat surfaces is easier than welding curved surfaces. The welding is preferably a laser welding.

According to the second embodiment, the distance separating the upper wall 20 and the lower wall 27 of the upper beam 12 and the distance separating the upper wall 29 and the lower wall 26 of the lower beam 14 are substantially equal such that the upper beam 12 and the lower beam 14 have substantially the same dimensions and equal cross-sections. According to a variant, the distance separating the upper wall 20 and the lower wall 27 of the upper beam 12 and the distance separating the upper wall 29 and the lower wall 26 of the lower beam 14 are different such that one of the cross-sections of the upper beam 12 and of the lower beam 14 is greater than the other cross-sections.

The space 31 substantially extends in the longitudinal direction from the plane of the rear walls 18, 24 to the plane of the front walls 16, 22, meaning that the space 31 extends substantially over the whole width of the bumper beam in the longitudinal direction. In the elevation direction, the space 31 for example has a height substantially comprised between a third and half of the height of one of the rear walls 18, 24. The space 31 is delimited by a junction wall 46 extending between the lower wall 27 of the upper beam 12 and the upper wall 29 of the lower beam 14, the junction wall 46 extending substantially in the plane of the front walls 16, 22. In the plane of the rear walls 18, 24, the space 31 is opened towards the exterior of the bumper beam 1.

According to the second embodiment, the bumper beam 1 therefore has a cross-section in a plane perpendicular to the transversal direction having a B-shape, as shown in FIGS. 4 and 5. However, the cross-section of the bumper could be different, for example by having non parallel front and rear walls and/or non-parallel upper and lower walls. The cross-section could also be different by having a bend in the junction wall 46.

According to a variant shown in FIG. 4, the lower wall 27 of the upper beam 12 and the upper wall 29 of the lower beam 14 are substantially planar and substantially parallel to each other or slightly diverging from each other towards the rear walls 18, 24.

According to a particularly advantageous variant of the second embodiment shown in FIG. 5, each of the lower wall 27 of the upper beam 12 and the upper wall 29 of the lower beam 14 comprises at least one change of plane between the corresponding front wall 16, 22 and the corresponding rear wall 18, 24, meaning that each of the lower wall 27 of the upper beam 12 and the upper wall 29 of the lower beam 14 extends in at least two different planes. Each of the lower wall 27 of the upper beam 12 and the upper wall 29 of the lower beam 14 comprises a front part 48 connected to the corresponding front wall 16, 22, a rear part 50 connected to the corresponding rear wall 18, 24, and a central part 52 connecting the front part 48 to the rear part 50. The central part 52 extends in a plane different from the plane in which the front part 48 and/or the rear part 50 extends. According to the embodiment shown in FIG. 5, each front part 48 extends in a first plane, each rear part 50 extends in a second plane and each central part 52 extends in a third plane. The first and second planes are substantially parallel and perpendicular to the planes of the front walls 16, 22 and of the rear walls 18, 24. The third plane is inclined between the first plane and the second plane. For example, the third plane forms an angle α comprised between 10° and 170° with the first and second planes. According to an example, angle α is comprised between 30° and 60°. The central part 52 therefore forms a step in each of the lower wall 27 of the upper beam 12 and the upper wall 29 of the lower beam 14. During the deformation of the bumper beam during an impact, the step in the in each of the lower wall 27 of the upper beam 12 and the upper wall 29 of the lower beam 14 separates these walls in two parts extending in different planes, which therefore delays the buckling of the two parts. Indeed, the effort to induce buckling of a surface becomes lower as the length of the surface in the longitudinal direction in which the effort is applied on the bumper beam during the impact increases. Compared to walls extending in a single plane, since providing a step in the central wall makes it possible to reduce the length of the surface of the first and second parts of the lower wall 27 of the upper beam 12 and of the upper wall 29 of the lower beam 14 in the longitudinal direction, buckling of the first and second parts is delayed relative since the effort to induce buckling is greater. Delaying the buckling allows maintaining the hollow bodies of the upper beam 12 and of the lower beam 14 over a greater distance of deformation which improves the performances of the bumper beam during the impact in terms of absorbed energy. Each central part 52 is connected to the corresponding front part 48 and to the corresponding rear part 50 by radiused portions 54, i.e. curved portions making the transition between the first plane and the third plane and between the third plane and the second plane. The radius of curvature of the radiused portions 54 is greater or equal to 0.5 times the thickness of the steel sheet 10. According to an example, the radius of curvature of the radiused portions 54 is greater or equal to two times the thickness of the steel sheet 10. According to the example mentioned previously, the radius of curvature of the radiused portions 54 is therefore greater or equal to a value between 1.6 mm and 3 mm depending on the thickness of the steel sheet 10.

The first part 48 extends for example at a height different than the height of the second part 50. For the lower wall 27 of the upper beam 12, this means that the distance between the first part 48 and the upper wall 20 of the upper beam 12 is different from the distance between the second part 50 and the upper wall 20 of the upper beam 12. According to the embodiment shown in FIG. 5, the first distance between the first part 48 of the lower wall 27 and the upper wall 20 of the upper beam 12 is greater than the distance between the second part 50 of the lower wall 27 and the upper wall 20 of the upper beam 12. For the upper wall 29 of the lower beam 14, the distance between the first part 48 and the lower wall 26 of the lower beam 14 is different from the distance between the second part 50 and the lower wall 26 of the lower beam 14. According to the embodiment shown in FIG. 5, the first distance between the first part 48 of the upper wall 29 and the lower wall 26 of the lower beam 14 is greater than the distance between the second part 50 of the upper wall 29 and the lower wall 26 of the lower beam 14. Consequently, according to the embodiment shown in FIG. 5, the distance between the first parts 48 of the lower wall 27 of the upper beam 12 and of the upper wall 29 of the lower beam 14 is inferior to the distance between the second parts 50 of the lower wall 27 of the upper beam 12 and of the upper wall 29 of the lower beam 14. This means that the third planes of the central parts 52 of the lower wall 27 of the upper beam 12 and of the upper wall 29 of the lower beam 14 are diverging planes. According to an embodiment, the difference between the first distance and the second distance is less than a third of the distance separating the upper wall 20 of the upper beam 12 from the lower wall 26 of the lower beam 14. According to an embodiment, the difference between the first distance and the second distance is for example comprised between the thickness of the steel sheet and 15 mm, for example around 6 mm.

The first part 48 of the lower wall 27 of the upper beam 12 is connected to the front wall 16 of the upper beam 12 by a radiused front end 56 and the second part 50 is connected to the rear wall 18 of the upper beam 12 by a radiused rear end 58. The first part 48 of the upper wall 29 of the lower beam 14 is connected to the front wall 22 of the lower beam 14 by a radiused front end 60 and the second part 50 is connected to the rear wall 24 of the lower beam 14 by a radiused rear end 62. Like the radiused portions 54 between the central part 52 and the front and rear parts 48, 50, the radius of curvature of the radiused front and rear ends 56, 58, 60, 62 is greater or equal to 0.5 times the thickness of the steel sheet 10. According to an example, the radius of curvature of the radiused ends 56, 58, 60, 62 is greater or equal to two times the thickness of the steel sheet 10.

According to the embodiment shown in FIG. 5, the lower wall 27 of the upper beam 12 and the upper wall 29 of the lower beam 14 each have a center of symmetry at the center of the wall in the longitudinal direction.

The lower wall 27 of the upper beam 12 and the upper wall 29 of the lower beam 14 extending substantially at the center of the bumper beam 1 increase the resistance of the bumper beam 1, to an effort applied against the bumper beam 1 during an impact. Consequently, the bumper beam 1 can absorb a greater maximum effort applied during an impact. Furthermore, the step formed by the central parts 52 delays buckling of the surfaces extending in a single plane during the impact, which makes the bumper beam 1 able absorbing a greater quantity of energy during the deformation of the bumper beam 1 and less likely to break during deformation, as explained previously. Consequently, the lower wall 27 of the upper beam 12 and the upper wall 29 of the lower beam 14 improve the characteristics of the bumper beam.

It should be understood that the shape of the lower wall 27 of the upper beam 12 and the upper wall 29 of the lower beam 14 could be different. According to an example, the first and second parts 48, 50 of the lower wall 27 of the upper beam 12 and the upper wall 29 of the lower beam 14 could extend in a same plane while the central part 52 could extend in more than one plane. The distance between the first parts 48 of the lower wall 27 of the upper beam 12 and the upper wall 29 of the lower beam 14 could be superior to the distance between the second parts 50 of the lower wall 27 of the upper beam 12 and the upper wall 29 of the lower beam 14. The cross-sections of the upper beam 12 and of the lower beam 14 could be different from each other.

According to the embodiment shown in FIGS. 4 and 5, the first edge 42 and the second edge 44 of the steel sheet 10 are both attached to the junction wall 46 to close the cross-sections of the upper beam 12 and of the lower beam 14. The first edge 42 covers the radiused front end 56 between the lower wall 27 of the upper beam 12 and the second edge 44 covers the radiused front end 60 between the upper wall 29 of the lower beam 14. The first and second edges 42, 44 extend in the same plane parallel to the plane of the junction wall 46 such that planar surfaces are attached together when the edges are attached to the junction wall. This makes the closing of the cross-sections an easier step. For example, the first and second edges 42, 44 are attached by welding the junction wall 46 and welding flat surfaces is easier than welding curved surfaces. The welding is preferably a laser welding.

According to the first and second embodiments described above, the front walls 16, 22 of the upper and lower beams 12, 14 each comprise a front rib 64 extending transversally along the whole length of the bumper beam 1. Each front rib 64 has a groove or channel shape extending from the front wall towards the interior of the bumper beam, i.e. inside the cross-section of the bumper beam towards the rear wall extending opposite the front wall on which the front rib 64 is provided. As already known such front ribs 64 increase the impact strength value of the upper and lower beams 12, 14 making the bumper beam 1 able to sustain important maximal efforts during the impact. Each front rib 64 has an arcuate shape. According to an embodiment, the radius of curvature of each front rib 64 is equal or greater than 0.5 times the thickness of the steel sheet 10. According to an example, the radius of curvature of each front rib 64 is greater or equal to two times the thickness of the steel sheet 10. Each front rib 64 extends substantially at the center of the front wall 16, 22 in the elevation direction. According to an embodiment, the height of the front rib 64, i.e. the dimension of the front rib 64 measured in the elevation direction is substantially comprised between a 10% and half of the height of the front wall on which the front rib extends. The height of the front rib is for example comprised between 10 mm and 30 mm. The depth of the front rib 64, i.e. the dimension of the rib measured in the longitudinal direction is for example comprised between a tenth and a third of the distance between the front wall on which the rib extends and the rear wall facing the front wall. For example, the depth of the front rib 64 is comprised between 3 mm and 10 mm. According to a particular example, the height of the rib is equal to the depth of the rib. The front rib 64 extending on the front wall 16 of the upper beam 12 is for example substantially identical to the front rib 64 extending on the front wall 22 of the lower beam 14. According to various embodiments, at least one of the upper wall 20 of the upper beam 12, the lower wall 26 of the lower beam 14, the rear wall 18 of the upper beam 12 and the rear wall 24 of the lower beam 14 further comprises a rib extending transversally and towards the interior of the bumper beam 1. It is understood by "a rib extending transversally and towards the interior of the bumper beam" that the rib extends inside the cross-section of the bumper beam.

According to an embodiment particularly advantageous when the rear walls 18, 24 have an important height, the rear walls 18, 24 of the upper and lower beams 12, 14 each comprise a rear rib 66 extending transversally along the whole length of the bumper beam 1, as shown in FIGS. 2 and 3. Each rear rib 66 has a groove or channel shape extending from the rear wall towards the interior of the bumper beam, i.e. inside the cross-section of the bumper beam towards the front wall extending opposite the rear wall on which the rear rib 66 is provided. It should be noted that the rear ribs 66 have been represented on the bumper beam 1 according to the first embodiment but that the rear ribs 66 could also be provided in the bumper beam 1 according the second embodiment.

The rear ribs 66 are provided for improving the production of the bumper beam 1 in order to obtain a bumper beam of improved quality. As described previously, the bumper beam 1 is curved and the intrados extends on the rear walls 18, 24 side of the bumper beam 1. Large planar surfaces on the intrados side, such as the surfaces formed by the rear walls 18, 24 without the ribs, tend to buckle during the bending of the bumper beam 1 performed to curve the bumper beam 1 in the transversal direction. This buckling creates waves in the planar surfaces which therefore do not remain planar after bending. This phenomenon is greater as the radius of curvature of the bumper beam is smaller. As explained previously, this buckling is problematic in terms of integration of the bumper beam in its environment and of attachment of the crash-boxes.

Providing ribs 66 on the rear walls 18, 24 allows reducing the dimensions of the planar surfaces forming the rear walls 18, 24 by reducing the height of the planar surfaces measured in the elevation direction. Consequently, thanks to the rear ribs 66, buckling of the rear walls 18, 24 can be avoided during the bending of the bumper beam. Indeed, the effort to induce buckling of a surface becomes lower as the length of the surface in the elevation direction increases. Since providing a rib in the rear wall makes it possible to reduce the length of the planar surfaces in the elevation direction, buckling of the planar surfaces can be avoided because the effort to induce buckling is greater and remains inferior to the effort applied on the bumper beam during the bending of the bumper beam.

To this end, the height and position of each rear rib 66 on a rear wall is arranged such that the planar surfaces 68 extending on either side of the rear rib 66 does not have a height sufficient to cause buckling during the bending of the bumper beam. According to an example, the height of each planar surface 68 does not exceed the half of the height of the rear face on which the rib 66 extends. Each rear rib 66 for example extends substantially at the center of the rear wall 18, 24 in the elevation direction. The height of each rear rib 66 is for example substantially comprised between a third and half of the height of the front wall on which the front rib extends. For rear faces having a larger height, it could be advantageous to provide more than one rear rib on said rear faces to limit the height of each planar surface of said rear faces such that buckling of rear faces can be avoided during bending of the bumper beam 1. According to an embodiment, the rear ribs 66 are arranged such that the height of each planar surface is inferior or equal to 30 mm.

Each rear rib 66 has an arcuate shape. According to an embodiment, the radius of curvature of each rear rib is equal or greater than 0.5 times the thickness of the steel sheet 10. According to an example, the radius of curvature of each rear rib is greater or equal to two times the thickness of the steel sheet 10. The depth of each rear rib can be of any value greater than or equal to 0.5 times the thickness of the steel sheet 10 depending on the wanted geometry of the rear wall. According to an embodiment, the depth can be such that the rear rib 48 extends up to the front wall extending opposite the rear wall on which the rear rib extends or up to the front rib 64 when the rear rib 66 extends opposite a front rib 64. According to the embodiment shown in the figures, the depth of the rear ribs 66 is inferior to the depth of the front ribs 64. The rear ribs 66 can extend opposite the front ribs 64 or can be offset relative to the front ribs 64 in the elevation direction.

Moreover, a rear rib 66 extending transversally and towards the interior of the bumper beams avoids the risk of a perforation of the radiator which could occur with a rib extending transversally and towards the exterior of the bumper beam, for example during a crash pushing the bumper beam against the radiator.

According to an embodiment, which can be an alternative to or can be implemented with the embodiments described above, the upper wall 20 of the upper beam 12 and/or the lower wall 26 of the lower beam 14 comprise a reinforcement rib 70 which extends transversally along the whole length of the bumper beam 1. It should be noted that the reinforcement ribs 70 have been represented on the bumper beam 1 according to the second embodiment but that the reinforcement ribs 70 could also be provided in the bumper beam 1 according the first embodiment.

The reinforcement rib 70 extends transversally and towards the interior of the bumper beam.

The reinforcement rib 70 has substantially the same effect as the front ribs 64 and improves the performances of the bumper beam 1. Furthermore, the reinforcement rib 70 can also be advantageous to reduce buckling risks in the upper wall 20 of the upper beam 12 and/or the lower wall 26 of the lower beam 14. The reinforcement rib 70 has an arcuate shape. According to an embodiment, the radius of curvature of the reinforcement rib 70 is equal or greater than 0.5 times the thickness of the steel sheet 10. According to an example, the radius of curvature of the reinforcement rib 70 is greater or equal to two times the thickness of the steel sheet 10. The depth of each reinforcement rib 70, i.e. the dimension of the reinforcement rib 70 in the elevation direction, can be of any value greater than or equal to 0.5 times the thickness of the steel sheet 10 depending on the wanted geometry of the wall on which the rib extends. However, the reinforcement rib 70 is preferably arranged not to interfere with the front and/or rear ribs or with the central wall 28 or with the lower wall 27 of the upper beam 12 or with the upper wall 29 of the lower beam 14. According to an embodiment, the depth of the reinforcement rib 70 is less than a third of the total height of the bumper beam 1. The reinforcement rib for example extends in the longitudinal direction at the center of the wall on which the rib extends. The reinforcement rib 70 allows improving the performances of the bumper beam 1 in terms of resistance to breaking and in terms of absorption of a maximal effort by creating a further deformation pattern.

According to the embodiment shown in FIGS. 1 and 3, which could also be implemented in the bumper beam 1 according to the second embodiment, the bumper beam 1 further comprises a reinforcement element 72 made of another roll formed or stamped steel sheet attached to the upper wall 20 of the upper beam 12 and to the lower wall 26 of the lower beam 14 and extending in front of the front walls 16, 22. The reinforcement element 72 extends in transversal direction over at least a part of the bumper beam 1 to form an impact surface in front of at least a part of the front walls 16, 22. The reinforcement element 72 is arranged to form at least one cavity 74 with the front walls 16, 22, the cavity 74 extending between the front walls 16, 22 and the reinforcement element 72. According to the embodiment shown in the figures, the reinforcement element 72 comprises an upper wall 76 defining, with the front wall 16 of the upper beam 12, an upper cavity 74a and a lower wall 78 defining, with the front wall 22 of the lower beam 14, a lower cavity 74b. Between the upper wall 76 and the lower wall 78, the reinforcement element 72 comprises a central wall 80 applied against the front walls 16, 22 opposite the central wall 28 of the bumper beam 1 or opposite the lower wall 27 of the upper beam 12 and the upper wall 29 of the lower beam 14. The reinforcement element 72 can comprise ribs 82 extending transversally in the upper wall 76 and/or the lower wall 78.

The reinforcement element 72 allows improving the energy absorption of the bumper beam 1 by forming a supplementary deformable structure in front of the bumper beam 1. To this end, the reinforcement element 72 extends preferably where additional energy has to be absorbed and where additional space in the longitudinal direction is available in front of the bumper beam 1 since the reinforcement element 72 increases the cross-section of the bumper beam in the longitudinal direction. For example, the reinforcement element 72 extends in the transversal direction around the center of the bumper beam 1 where most of the energy of an impact is applied in case of a full front impact against the vehicle. The product of the cross-section of the cavity 74 with the tensile strength of the steel forming the reinforcement element 72 and the thickness of the steel sheet forming the reinforcement element is inferior to the product of cross-section of the bumper beam 1 without the reinforcement element with the tensile strength of the steel forming the bumper beam and the thickness of the steel sheet such that the bumper beam with the reinforcement element 72 locally absorbs more energy than the rest of the bumper beam. For example, the reinforcement is made of a steel which is more ductile than the steel of the bumper beam.

According to an example, the reinforcement element extends along between 10% and the two thirds of the length of the bumper beam 1 in the transversal direction and the cavity 74 has a cross-section substantially equal to a third of cross-section of the bumper beam without the reinforcement element in the longitudinal direction. The reinforcement element 72 is for example made of a dual phase steel having a tensile strength substantially comprised between 780 and 1500 MPa and has a thickness for example equal to the thickness of the steel sheet 10. The reinforcement element 72 is for example laser welded to the bumper beam 1.

The reinforcement element 72 can also be used to adapt the geometry of the bumper beam 1 to particular geometry requirements of different vehicles. For example, the height of the reinforcement element 72 can be greater than the height of the bumper beam 1 such that the bumper beam 1 can be used in vehicles having a larger height than standard vehicles. In this case, the reinforcement element 72 can extend along the whole length of the bumper beam 1. Consequently, the reinforcement element 72 can be used to adapt the bumper beam 1 to a large range of vehicles wherein the bumper beam 1 remains the same for all vehicles and only the reinforcement element is modified to be compliant with the requirements of the vehicle.

The method for forming the bumper beam 1 described above is partially represented in FIG. 6 where the successive roll forming steps of the steel sheet 10 to form a bumper beam according to the first embodiment are represented and labelled 0 to 23. These twenty three roll forming steps correspond to the number of steps required to form a bumper beam 1 having a central wall 28 with a step, which is formed in roll forming steps 4 to 7, as more clearly visible in FIG. 5, and front ribs 64 extending in the front walls 16, 22 and rear ribs 68 in the rear walls 18, 24 of the upper beam 12 and of the lower beam 14, which are formed at least in roll forming steps 1 to 3. The various roll forming steps are performed in successive roll forming stations.

At the end of the roll forming steps, the edges 42 and 44 of the steel sheet 10 are welded to the corresponding front and rear walls or to the junction wall 46 and the bumper beam 1 is arched in the transversal direction to obtain its arcuate shape. Thanks to the rear ribs 68, this operation does not cause the rear walls 18, 24 to buckle even when the radius of curvature of the bumper beam 1 is reduced and the height of the rear walls is important.

When the bumper beam 1 comprises a reinforcement element 72, this reinforcement element 72 is formed separately for example by roll forming or by stamping, and is attached to the formed bumper beam 1.

The bumper beam disclosed above having an 8-shaped cross section, with a third plane forming an angle α substantially equal to 45° with the first and second planes, is for example able to be deformed in the longitudinal direction on a distance greater than 200 mm without breaking. The peak effort sustained by the bumper beam is greater than 30 KN, for example around 33 KN (Ep in FIG. 6) and the minimal energy absorbed after a deformation of 250 mm (Em in FIG. 6) is greater than 5.5 KJ, for example around 5.75 KJ. Consequently, the bumper beam 1 presents good performances in all three relevant parameters, i.e resistance to a peak effort greater than an effort threshold, minimal energy absorbed and resistance to breaking.

According to an embodiment of the method for forming the bumper beam, which can be implemented with the embodiments described above, the method for forming the bumper beam comprises roll forming steps (not shown) for forming in the upper wall 20 of the upper beam 12 and/or in the lower wall 26 of the lower beam 14 the reinforcement rib 70 extending transversally and towards the interior of the bumper beam. The roll forming steps for forming the reinforcement rib 70 in the upper wall 20 of the upper beam 12 and/or in the lower wall 26 of the lower beam 14 are performed in successive roll forming stations.

The ribs extending transversally and towards the interior of the bumper beam make it possible to limit the volume occupied by the bumper beam. Indeed, the depth of the vehicle (i.e. the dimension of the vehicle measured in the longitudinal direction) should not exceed 50 mm to 60 mm, otherwise the vehicle could be too long.

Moreover, the ribs extending transversally and towards the interior of the bumper beam are more satisfactory than ribs extending transversally and towards the exterior of the vehicle. Indeed, a rib extending towards the outside of the vehicle forms a protrusion where the efforts concentrate in case of an impact. In the case of a rib directed towards the interior of the bumper beam, the efforts are divided on the two large surfaces extending on either side of the rib. The risk of fracture of the bumper beam is thus reduced.

What is claimed is:

1. A bumper beam for an automotive vehicle made of at least one rolled formed steel sheet comprising an upper beam and a lower beam extending in a transversal direction, said upper beam and said lower beam each having a closed cross-section defined by a front wall, a rear wall, an upper wall and a lower wall, the upper wall and the lower wall joining the front wall to the rear wall, wherein each of the front walls of the upper beam and of the lower beam comprises a front rib extending transversally and towards the interior of the bumper beam, wherein at least one of the upper wall of the upper beam, the lower wall of the lower beam, the rear wall of the upper beam and the rear wall of the lower beam further comprises a rib extending transversally and towards the interior of the bumper beam, wherein a space extends between the lower wall of the upper beam and the upper wall of the lower beam, and the lower wall of the upper beam and/or the upper wall of the lower beam extends in at least two different planes.

2. The bumper beam according to claim 1, wherein at least one of the rear walls of the upper beam and of the lower beam comprises a rear rib extending transversally and towards the interior of the bumper beam.

3. The bumper beam according to claim 2, wherein the rear rib has a curved cross-section having a radius of curvature greater or equal to 0.5 times the thickness of the steel sheet.

4. The bumper beam according to claim 2, wherein the rear wall on which the rear rib extends comprises at least two planar surfaces extending on either side of the rear rib, the position and/or the height of the rear rib being arranged such that each planar surface has a height inferior or equal to half of the height of the rear wall on which the rear rib extends.

5. The bumper beam according to claim 2, wherein the depth of the rear rib is superior or equal to 0.5 times the thickness of the steel sheet and inferior than or equal to the distance between the front wall and the rear wall on which said rear rib extends.

6. The bumper beam according to claim 2, wherein the rear rib extends opposite a front rib.

7. The bumper beam according to claim 2, wherein each of the rear walls of the upper beam and of the lower beam comprises a rear rib extending transversally and towards the interior of the bumper beam.

8. The bumper beam according to claim 1, wherein the upper wall of the upper beam and/or the lower wall of the lower beam comprises a reinforcement rib extending transversally and towards the interior of the bumper beam.

9. The bumper beam according to claim 8, wherein the reinforcement rib has a curved cross-section having a radius of curvature greater than or equal to 0.5 times the thickness of the steel sheet.

10. The bumper beam according to claim 8, wherein the depth of the reinforcement rib is superior than or equal to 0.5 times the thickness of the steel sheet and inferior or equal to a third of the distance between the upper wall of the upper beam and the lower wall of the lower beam.

11. The bumper beam according to claim 1, wherein the bumper beam is curved in the transversal direction, the curvature radius of the bumper beam being less than or equal to 4000 mm.

12. Bumper beam according to claim 1, wherein the steel sheet is made of a steel having a tensile strength greater or equal to 980 Mpa.

13. The bumper beam according to claim 12, wherein the steel sheet has a thickness substantially comprised between 0.8 mm and 1.5 mm.

14. The bumper beam according to claim 1, wherein a central wall extending between the front walls and the rear walls of the upper beam and of the lower beam forms both the lower wall of the upper beam and the upper wall of the lower beam.

15. The bumper beam according to claim 14, wherein the central wall extends in at least two different planes.

16. The bumper beam according to claim 1, further comprising a reinforcement element made of a steel sheet, said reinforcement element being attached to the upper beam and to the lower beam such that the reinforcement element extends opposite at least a part of the front walls of the upper beam and of the lower beam and defines with said front walls at least one cavity extending between said front walls and said reinforcement element.

17. A method for producing a bumper beam according to claim 1, comprising the steps of:
 providing a steel sheet,
 roll forming the steel sheet in successive rolling stations in order to form a bumper beam comprising an upper beam and a lower beam extending in a transversal direction, said upper beam and said lower beam each having a closed cross-section defined by a front wall, a rear wall, an upper wall and a lower wall, the upper wall and the lower wall joining the front wall to the rear wall, wherein each of the front walls of the upper beam and of the lower beam comprises a front rib extending transversally and towards the interior of the bumper beam,
 wherein at least one of the upper wall of the upper beam, the lower wall of the lower beam, the rear wall of the upper beam and the rear wall of the lower beam is shaped in at least one of the rolling stations to comprise a rib extending transversally and towards the interior of the bumper beam,
 wherein a space extends between the lower wall of the upper beam and the upper wall of the lower beam, and
 wherein the lower wall of the upper beam and/or the upper wall of the lower beam extends in at least two different planes.

18. The method according to claim 17, wherein the steel sheet is made of a steel having a tensile strength greater or equal to 980 MPa.

* * * * *